(12) United States Patent
Baumgartl et al.

(10) Patent No.: US 7,940,046 B2
(45) Date of Patent: May 10, 2011

(54) MAGNETIC RESONANCE APPARATUS WITH STRUCTURALLY SEPARATE RF TRANSMIT AND RF RECEPTION DEVICES

(75) Inventors: Rudi Baumgartl, Erlangen (DE); Matthias Buettner, Buckenhof (DE); Georg Pirkl, Dormitz (DE); Andreas Potthast, Kulmbach (DE)

(73) Assignee: Siemens Aktiengesellschaft, Munich (DE)

(*) Notice: Subject to any disclaimer, the term of this patent is extended or adjusted under 35 U.S.C. 154(b) by 973 days.

(21) Appl. No.: 11/743,223

(22) Filed: May 2, 2007

(65) Prior Publication Data
US 2007/0258479 A1    Nov. 8, 2007

(30) Foreign Application Priority Data
May 2, 2006   (DE) .......................... 10 2006 020 119

(51) Int. Cl.
*G01V 3/00* (2006.01)
(52) U.S. Cl. ...................................... 324/322; 324/318
(58) Field of Classification Search .......... 324/300–322; 600/407–435; 370/463; 382/128–131
See application file for complete search history.

(56) References Cited

U.S. PATENT DOCUMENTS

| | | | | |
|---|---|---|---|---|
| 6,198,287 | B1 | 3/2001 | Heiserholt et al. | 324/322 |
| 6,459,265 | B1* | 10/2002 | Lou et al. | 324/322 |
| 6,590,391 | B1* | 7/2003 | Shudo et al. | 324/318 |
| 7,449,886 | B2* | 11/2008 | Buchwald | 324/311 |
| 7,477,057 | B2* | 1/2009 | Baumgartl et al. | 324/322 |
| 2002/0030491 | A1 | 3/2002 | Kose | 324/318 |
| 2006/0054810 | A1* | 3/2006 | Grasslin et al. | 250/299 |
| 2007/0258479 | A1* | 11/2007 | Baumgartl et al. | 370/463 |
| 2008/0136417 | A1* | 6/2008 | Baumgartl et al. | 324/322 |
| 2009/0251141 | A1* | 10/2009 | Baumgartl et al. | 324/307 |

FOREIGN PATENT DOCUMENTS

| | | |
|---|---|---|
| DE | 198 44 420 | 4/2000 |
| WO | WO 2004/061469 | 7/2004 |

* cited by examiner

*Primary Examiner* — Melissa J Koval
*Assistant Examiner* — Tiffany A Fetzner
(74) *Attorney, Agent, or Firm* — Schiff Hardin LLP (57) ABSTRACT

A magnetic resonance system has a first installation unit, in which a control processor device is arranged, as well as a radio-frequency coil arrangement for transmitting and receiving magnetic resonance signals. The radio-frequency coil arrangement is controlled or read out by a transmit device, having a digital transmit unit built into the first installation unit for emitting a digital transmit signal to an analog transmit unit, which outputs an analog transmit signal based on the digital transmit signal, and by a receiving apparatus, having at least one analog reception unit for converting an analog received signal into a digital reception signal and at least one digital reception unit for digital demodulation of the received signal. The digital reception unit is built into a further installation unit external to the first installation unit.

19 Claims, 4 Drawing Sheets

MAGNETIC RESONANCE APPARATUS WITH STRUCTURALLY SEPARATE RF TRANSMIT AND RF RECEPTION DEVICES

BACKGROUND OF THE INVENTION

1. Field of the Invention

The present invention relates to a magnetic resonance system.

2. Description of the Prior Art

Magnetic resonance systems are known that have a first installation unit in which a control processing device is arranged, as well as a radio-frequency coil arrangement for transmitting and receiving magnetic resonance signals, the radio-frequency coil arrangement being controlled or read out by a transmit device. The transmit device includes a digital transmission unit built into the first installation unit for emitting a digital transmit signal to an analog transmit unit, which outputs an analog transmit signal based on the digital transmit signal. A reception device has at least one analog reception unit for conversion of an analog received signal into a digital received signal and at least one digital reception unit for digital demodulation of the received signal.

Radio-frequency coils in magnetic resonance systems are used both for radio-frequency excitation of spin in a target region to be recorded and also to receive the magnetic resonance signals from this target region. To transmit the corresponding sequences in such cases, the entire radio-frequency coil arrangement is activated, but for receiving, to achieve a better resolution for example, only parts of the arrangement are used in each case, so that a large number of reception channels is produced. To implement the functionalities of the radio-frequency antenna arrangement, suitable transmit or reception electronics are needed, i.e. a transmit device and a reception device. To comply with the coherence conditions for magnetic resonance images, however, a precise synchronization and tuning between the transmit device and the reception device is necessary in such cases.

Both the transmit and the reception device can be subdivided in this case into an analog subunit and a digital subunit. In this case a low-frequency signal describing the desired sequence is digitally modulated or mixed in the digital transmit unit. The digital transmit unit communicates with the analog transmit unit, in which the digital transmit signal is converted by means of a Digital-Analog converter (D/A converter) into an analog transmit signal. It can then be modulated accordingly into an analog signal. This type of analog modulation, with the digital transmit signal initially lying on an intermediate frequency (ZF) and then being modulated onto the target frequency, is not absolutely necessary. The signal can also be processed completely digitally. In such a case the analog transmit unit only includes the D/A converter. The analog transmit signal is then sent out via the radio-frequency coil arrangement communicating with the analog transmit unit.

For reception of signals the received signals are initially directed to the analog reception unit where they are correspondingly demodulated if necessary, and converted by an A/D converter into a digital received signal. In the case of purely digital control the analog reception unit also only includes the A/D converter. Using corresponding communication links the digital reception signal is forwarded to a digital reception unit for digital demodulation. From there it is forwarded into a data preparation unit, in which the demodulated digital received signal is converted into data usable for image generation and correspondingly filtered. An image processing device then processes this data into an image.

As mentioned, it is essential in this case to obtain the necessary coherence condition. Usually both the digital transmit unit and the digital reception unit are built into a control processing unit used for controlling the operation of the magnetic resonance system, with the two units being jointly controlled by a suitable digital frequency generator unit, for example a numerically controlled oscillator (NCO).

The number of reception channels has a decisive influence on the quality of the magnetic resonance images recorded, especially on the signal-to-noise ratio in the recorded images. Known magnetic resonance systems have a limited number of such reception channels. There are essentially two reasons for this. One is that it is not possible to expand the analog reception units simply as required. Another is that digital reception units or data preparation units can process only a specific number of channels, which is usually not the same as the number of channels processed by an analog reception unit, so that a number of digital reception units are required for each analog reception unit, or vice versa. The connection options for a control processing device are, however, limited both by space and also by the number of the available connection options or the plurality of the devices needed for control. Such control processing devices or their components respectively are in such cases mostly arranged in an installation unit, for example a rack or electronics cabinet, in which the components can be plugged and provided with cables to interconnect them. These typical slots are mostly all occupied for a control processing device. Another factor is that, because a frequency generator unit is needed, the digital transmit unit and the digital reception unit are often integrated into one unit, but only a digital transmit unit is needed. In the final analysis the number of reception channels and thereby the signal-to-noise ratio are thus restricted.

A magnetic resonance microscope is known from United States Patent Application Publication No. 2002/0030491, in which a number of channels is created by recording a number of samples in parallel in different chambers shielded from one another with their own gradient coils and their own radio-frequency coils in a single large basic field.

A use of a number of transmit channels is known from PCT Application WO 2004/061469 A1 to enable the radio-frequency field to be better adapted.

A determination of an ideal analog synthesizer frequency is known from DE 198 44 420 C1.

SUMMARY OF THE INVENTION

An object of the present invention is to provide a magnetic resonance system that allows a larger number of reception channels.

This object is achieved in accordance with the present invention by a magnetic resonance system of the type initially described wherein the digital reception unit to be built into a further installation unit external to the first installation unit.

The invention thus departs from the conventional thinking of incorporating the digital transmit unit and the digital reception unit as a common system into the control processing device or into the first installation unit containing them. Instead, in accordance with the invention the digital reception unit is physically removed from the control processing device and it is instead installed in a further unit. This is of advantage since the connections of the further installation unit are far less heavily utilized than those of the control processing device, so that a number of such digital reception units provided as modules or contained in a module can be used, increasing the number of channels able to be processed. A decentralization of the transmit and reception electronics is proposed for the radio-frequency antenna arrangement, which allows a modularization of the desired multiple uses the received device or of its units, respectively.

The analog reception units also frequently arranged outside the processing units can be modularized within the framework of the invention and/or duplicated as required, so that at least two analog reception units can be provided. The expandability of the processable reception channels produces a better signal-to-noise ratio in the recorded images or a shorter measurement time with the same signal-to-noise ratio.

An installation unit in accordance with this embodiment of the invention can be, for example, a rack or an electronics cabinet, in which components which belong together functionally which are controlled by processors entrusted with a specific function are collected, but also housings, in which such components are accommodated. An image processing device or an installation unit accommodating the image processing unit is particularly suitable as a further installation unit, into which the digital reception unit can be installed. This is especially advantageous since the signals output by the digital reception units can be further processed and reconstructed to form an image in situ, i.e. in the image processing device.

The magnetic resonance system can in this case also include the data preparation unit for processing the digital reception signals into image data. Provision can then especially advantageously be made for the data preparation unit and the digital reception unit to be integrated mechanically into a data receiving structural unit. At least two data reception units embodied as exchangeable, identical modules can thus easily be fitted into the image processing unit, which generally has more free installation space or more free slots than the control processing device, or into the installation unit containing the image processing unit, respectively. The functions of data preparation and of digital demodulation are then advantageously combined into a single constructional unit, of which there can be a number present in the inventive magnetic resonance system. The data receiving structural units are embodied identically both in their components and also in their connections, making them interchangeable and controllable in the same manner.

Naturally it is also possible to implement the digital reception units and the data preparation units separately from each other as modules of the same type in each case, which then likewise as a result of the lower loading can easily be built into the image processing device or into the installation unit containing the digital reception units.

A radio-frequency small signal sub-housing can be provided as a further installation unit, within which the analog reception units are arranged. The digital reception units can also be built into such a radio-frequency small signal sub-housing. They can then be constructed in an equally modular fashion in accordance with the invention, which means that all digital reception units are identically embodied both in their connections and in their internal layout, and are therefore interchangeable.

Also of special importance for the inventive magnetic resonance system is that the magnetic resonance coherence conditions must be maintained. In an embodiment both the digital transmit unit and the digital reception unit can include a frequency generator unit, particularly a numerically controllable oscillator, with the frequency generator units being able to communicate with each other for synchronization. A reason for the previous mechanical proximity of the digital transmit unit and the data receiving structural unit was that the activation was undertaken using a single digital frequency generator unit, so that the coherence condition was obtained. In accordance with the invention, each digital reception unit being modularized and built into the further installation unit includes its own frequency generator unit, with all these frequency generator units being synchronized with each other via a communication link. The one frequency generator unit previously used is replaced by a number of frequency generator units synchronized with each other, which makes it possible to remove the digital reception unit or digital reception units from the control processing device and instead, in accordance with the invention, to build them into the further installation unit.

Expediently, a control communication bus is provided for communication between the frequency generator units. It is then possible to connect a number of digital reception units to this control communication bus, as well as to expand the system by inserting further modularized digital reception units or data receiving structural units, respectively. Further parameters, such as intermediate frequency, low-pass filtering settings, samples per echo, etc. can also be transmitted via this control communication bus. The control communication bus, however, is generally not able to be connected to all loads so that the number of connectable digital reception units or data receiving structural units, respectively, is restricted. A control communication bus splitter for splitting the control communication bus signals can be provided at the digital reception units. Such duplication by a splitter should be undertaken for example from five or more digital reception units. This splitting is possible in a simple manner since the control communication bus operates omnidirectionally, which means that parameters are only transmitted from the digital transmit unit to the digital reception unit or units.

In the image processing device the data receiving structural unit or the data preparation unit respectively can be connected directly to an image processing computer. It is then especially advantageous for the data preparation units or the data receiving structural units respectively to be connected to a communication bus of the image processing computer, especially a PCI bus. In connection with the control communication bus, especially the data receiving structural units are now in the final analysis connected on both sides to a bus system, which is an advantage in constructing a modular system able to be expanded in any way required. If the digital reception unit and data preparation unit are available separately as self-contained modules, the two units are each connected to a bus system and digital reception unit and data preparation unit additionally communicate with one another. The data reception capacities of the magnetic resonance system thus can be easily expanded by adding further, similar, i.e. modularized data receiving structural units or digital reception units and data preparation units, since these units merely have to be connected in parallel to the existing data receiving structural units or digital reception units and data preparation units to the control communication bus and the communication bus of the image processing computer.

Despite this the number of communication bus slots of a specific image processing computer is initially also restricted, which prevents the data reception capacities being expanded simply as required. Here the present invention provides two advantageous solution options. It is possible for the image processing device to include a number of image processing computers, with each having at least one digital reception unit incorporated therein, if necessary within a data receiving structural unit. The individual image processing computers also reconstruct subimages of different channels, which are then later assembled into a common image.

In a further embodiment, however at least one expansion device is provided, such as a PCI expansion device, with a bridge component for expanding the number of connections to the communication bus of the image processing computer. Such expansion devices are advantageously less expensive than further image processing computers, and they allow the processing of all the signals in only a single computer. In a further embodiment a communication bus expansion card, such as a PCI bus expansion card, can be plugged into the image processing computer, the card having at least one communication output. This is connected via electrical or optical lines to a so-called bridge component in a separate housing, which generates the corresponding signals for new communication bus slots. Naturally communication bus expansion cards can be used in the expansion device, so that in the final analysis any required level of expansion is accommodated. Any number of slots are created for data preparation units or data receiving structural units. The bridge component numbers the communication busses in accordance with the way defined in the standard, so that access to the expanded slots is possible in precisely the same way as to the slots in the image processing computer. It is then only necessary for the software driver for the data preparation units or data receiving structural units to be able to handle the corresponding number of data preparation units or data receiving structural units. This is however simple to implement since the data preparation units or data receiving structural units are modularized, meaning that they are identical and thus that they behave in the same manner.

In such cases any PCI standard, i.e. also a PCI-X bus or a PCI-Express bus can be used in the area of the PCI buses. In this case the relatively modern PCI-Express bus is especially advantageous. Any given transmission protocol can be provided between the communication bus expansion card and the bridge component (proprietary or standardized, for example Ethernet, InfiniBand, Fiber Channel, SCSI, etc.). The bridge component of the expansion device in the final analysis only needs to be embodied to convert the transmission protocol to the corresponding communication bus signaling.

Such an expansion device also means that only one image processing computer with software is needed, and a large number of reception channels is possible. In addition the data does not have to be copied in together by a further program.

The analog reception units are also restricted in the number of channels that they are able to process. It is thus possible for the analog reception unit to comprise a plurality of output channels, which is the same as or a whole number multiple of the number of channels able to be processed by the digital reception unit, with each analog reception unit being assigned a digital reception unit or a corresponding multiple of digital reception units. It is thus possible for example for an analog reception unit to process 32 channels. A digital reception unit can for example process 16 channels, so that an analog reception unit is assigned two digital reception units in each case. Alternatively it is also equally possible for the digital reception unit to include a number of output channels which is a whole-number multiple of the number of channels able to be processed by the analog reception unit, with each corresponding duplication of analog reception units being assigned a digital reception unit. In order to be able to achieve any given expandability of the number of channels in all possible cases, the analog reception units too must be modular in construction and able to be switched in parallel.

Usually a synthesizer is provided for creating a synchronization clock and, if the signal is not processed purely digitally, to provide an analog LO frequency for analog modulation and/or demodulation. In order to now control a number of modular analog reception units operating in parallel by means of this synthesizer and thus to enable them to be synchronized, it is proposed according to the invention that a synchronization splitter and where necessary an LO splitter for splitting up the synchronization clock and where necessary the frequency at the analog reception units be provided. Also, the communication connection between the synthesizer, which in addition also controls the analog transmit unit, and the analog reception unit is a unidirectional connection, so that splitting up the signals is easily possible. It is then possible, however, to use any number of analog reception units, so that the system can easily be expanded in relation to them. The analog reception units are also advantageously modular in this case, i.e. identical in structure and have identical connections.

The communication connections for transmission of the synchronization clock and where necessary the frequency can be designed in this case so that they can each be loaded by an analog reception unit. Then for example, for n analog reception units, a 1:n synchronization splitter and where necessary a 1:n LO splitter would be required.

In a preferred embodiment, the present invention consequently makes it possible to expand the number of received channels practically as required. This is achieved by the modularization of the receive device. Both the digital reception units, which can advantageously be connected to the control communication bus and, in the event of them being integrated into a data receiving constructional unit, to the communication network of the image processing computer, are all identical, identically structured modules with the same connections or integrated into identical, data receiving structural units structured in the same way with the same connections. The connection options for the data receiving constructional units can be expanded as required by the use of a number of image processing computers or especially advantageously by the use of the expansion device as well as where necessary the use of the control communication bus splitter. The same is true, however, for the likewise modular analog reception units, of which, due to the corresponding splitters any number of similar modules can also be used. This is all made possible by building the digital reception unit into the image processing device or into the installation unit containing it.

In a further embodiment the synthesizer can also be arranged in the radio-frequency small signal sub-housing. This advantageously also combines the analog units and the synthesizer controlling them and, where necessary, the rest of the system, mechanically into one housing. In this case expansion housings for further analog reception units can be provided if an expansion is desired.

For faster communication a fiber cable optic can additionally be provided for data transmission between the analog reception unit and the corresponding further units.

DESCRIPTION OF THE PREFERRED EMBODIMENTS

Figure 1:
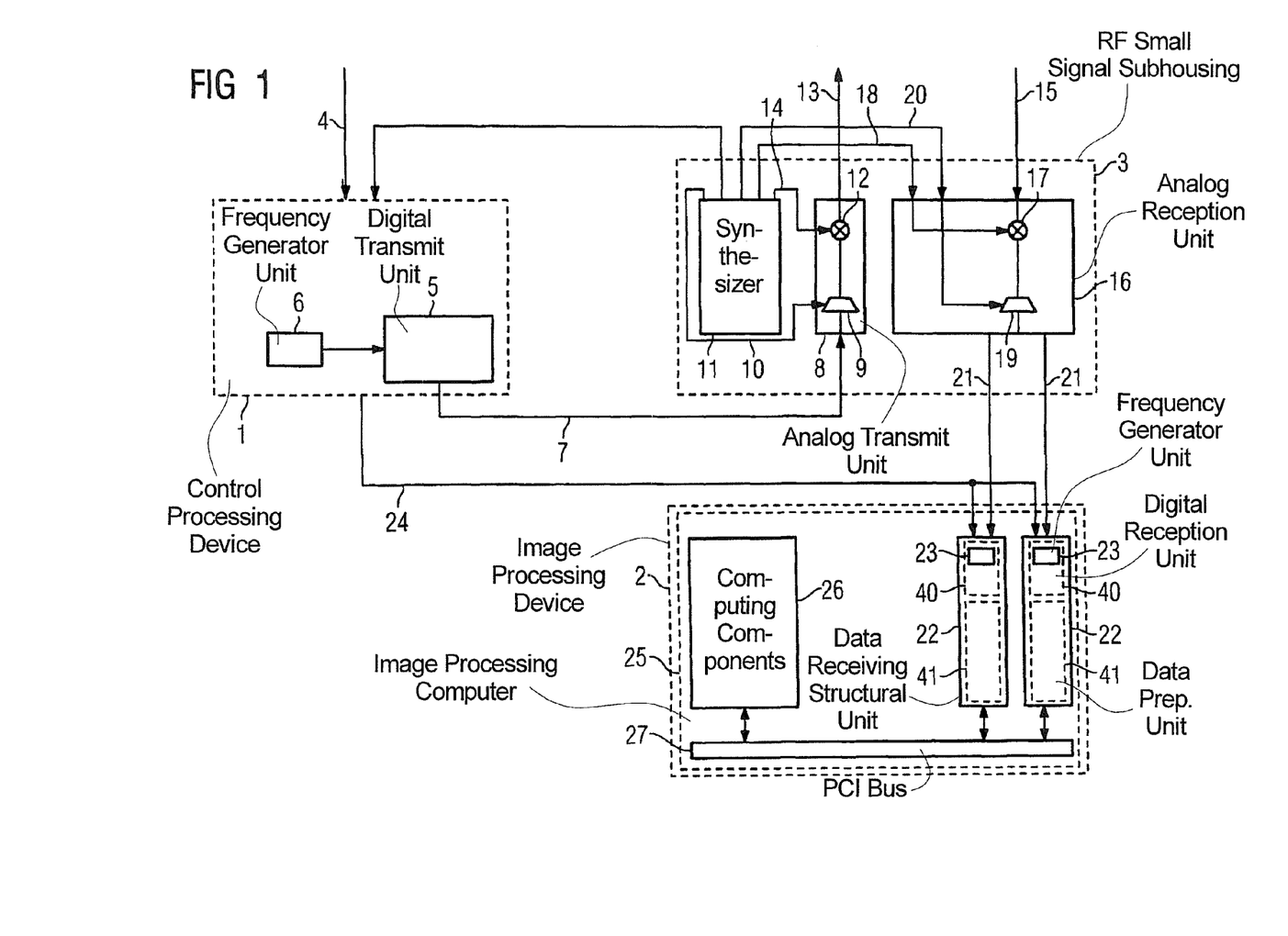
FIG. 1 is a block diagram of the transmit and reception system of an inventive magnetic resonance system.

FIG. 1 shows a block diagram of the transmit and reception system of a magnetic resonance system according to the present invention. It is identified by three structurally separate devices, namely a control processing device 1, an image processing device 2 and a high-frequency small signal sub-housing 3, which all represent an installation unit or are contained in such a unit. The control processor device 1 receives data to be processed, particularly a low-frequency signal, from a user interaction device (not shown), as indicated by the arrow 4. A digital transmit unit 5 is built into the control processor device 1 in which the digital modulation of the low-frequency signals is undertaken. The LO ("local oscillator") frequency used for this is generated by a frequency generator unit 6, here a numerically controlled oscillator (NCO), which is also incorporated into the control processor device 1, and for a 1.5 T installation, amounts to around 1.4 MHz for example. The corresponding signal generated by the digital transmit unit 5 is transmitted over a communication link 7 to the analog transmit unit 8 built into the radio-frequency small signal sub-housing 3. In the analog transmit unit 8 the signal is initially converted by a Digital/Analog converter 9 (D/A converter) into an analog signal. A synchronization clock, of 10 MHz for example, employed for the overall system, is used for this purpose. This is delivered over a communication link 10 by a synthesizer 11 likewise built into the radio-frequency small signal sub-housing 3. The resulting analog transmit signal is modulated appropriately by further electronic components 12 so that the output signal can then be emitted by the radio-frequency antenna arrangement not shown here in any greater detail, as indicated by the arrow 13. For analog modulation of the signal an analog LO frequency is needed, which is likewise generated by the synthesizer 11 and transmitted over a communication link 14. The analog transmit unit 8 is frequently also referred to as a "transmitter".

For a 1.5 T magnetic resonance device a radio-frequency of 6.6 MHz is needed for example. The digital transmit signal transmitted over the communication link 7 then for example has an intermediate frequency of 1.4 MHz, the analog LO frequency generated by the synthesizer 11 amounts to 65 MHz. The target frequency of 63.6 MHz is then achieved by the modulation. These figures are only to be seen as examples, naturally they depend on the actual design of the magnetic resonance system.

The signals received by the radio-frequency antenna arrangement or by a part of the radio-frequency antenna arrangement are, as indicated by the arrow 15, initially forwarded from the radio-frequency antenna to the analog reception unit 16 also built into the radio-frequency small signal sub-housing 3. In the analog reception unit 16 the received signal is initially demodulated by electronics 17 corresponding to electronics 12. The same frequency of the synthesizer 11 is need for this as would already have been used by the electronics 12 of the analog transmit unit. This is transmitted over a communication link 18 from the synthesizer 11 to the analog reception unit 16. The signal is then converted by an A/D converter 19 into a digital reception signal. Once again the system-wide synchronization clock of for example 10 MHz is required for this purpose, which is generated by synthesizer 11. It is also transmitted over a communication link 20 to the analog reception unit 16.

The analog reception unit 16, also frequently also referred to as the "receiver", can process a specific number of receive channels, in the example 32 reception channels. It is of modular design, meaning that it can be replaced at any time by an identical further analog reception unit 16, and that a number of analog reception units 16 can be switched in parallel to enable a wider spectrum of receive channels to be processed.

The digital reception signal on an intermediate digital frequency (for example 1.4 MHz in the case of the 1.5 T system already mentioned) is now forwarded over communication link 21 to the data receiving structural units 22 built into the image processing device 2. Both a digital reception unit 40 and a data preparation unit 41 are integrated into the data receiving structural unit 22.

Each of the data receiving structural units 22 can process 16 channels, so that in this case two data receiving constructional units 22 are needed, with each of the communication links 21, which are embodied in the present case as fiber optics lines, transmitting 16 channels.

In the data receiving structural units 22 the digital reception signal lying on the intermediate digital frequency is digitally demodulated within the digital reception unit 40 and further processed in the data preparation unit 41 and edited as data for the image processing system. The digital frequency generated by the frequency generator unit 6 is once again required for this purpose. So that this frequency can be generated a frequency generator unit 23 of identical design is also contained in the digital reception unit 40 of the data receiving structural units 22 in each case. The units involved here are NCOs.

The frequency generator units 6 and 23 must be synchronized to maintain the coherence conditions. This is made possible by a control communication bus 24. This bus connects the control processing unit to the data receiving constructional units 22 and operates omnidirectionally. The parameters of frequency generator unit 6 are delivered to the frequency generator units 23 over this bus, so that a synchronization is provided, for example through simultaneous start. Further parameters needed for digital demodulation and processing of the signals are also transmitted over the control communication bus 24, for example the intermediate frequency, low-pass filter settings, samples per echo etc. In this embodiment the control communication bus 24 operates with TTL (transistor-transistor-logic) signals.

The magnetic resonance image to be finally produced is created in an image processing computer 25 built into the image processing device. The image processing computer 25, in addition to the conventional computing components 26, i.e. CPU, memory, etc., also includes a PCI bus 27, to which the data receiving structural units 22 are connected. The data receiving structural units 22 are likewise of modular design, meaning that they have identical components and identical connections. The use of the control communication bus 24 and of the PCI bus 27 allow the data receiving structural units 22 to be switched in parallel as required.

Figure 2:
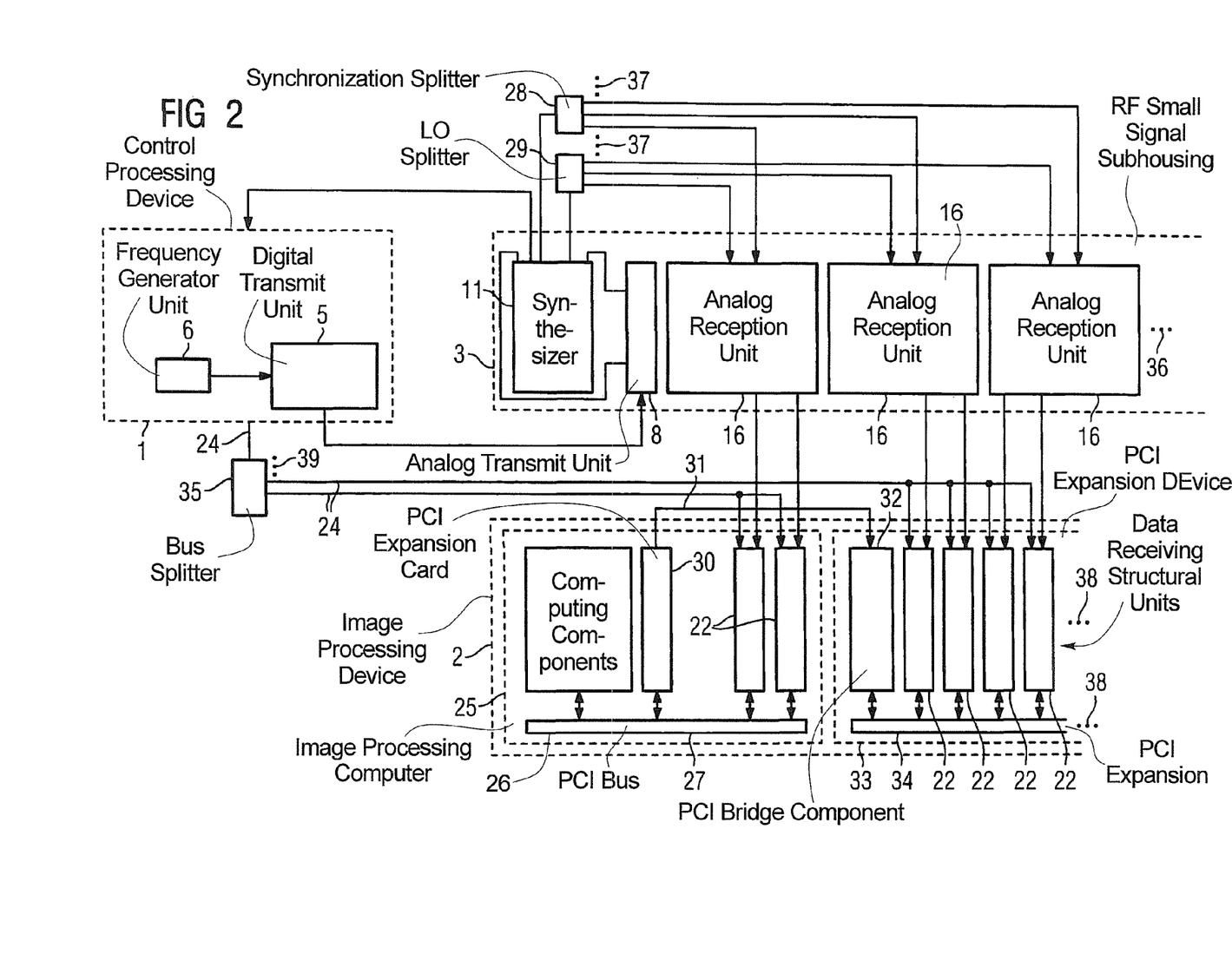
FIG. 2 is a block diagram of the transmit and reception system of a magnetic resonance system expanded in relation to FIG. 1.

Accordingly it is also possible, through corresponding duplication of the corresponding modular components, i.e. analog reception unit 16 and the data receiving constructional unit 22, to expand the receive options of the magnetic resonance system to a larger number of channels. This is shown in FIG. 2, in which the same components have been provided with the same reference symbols. The transmit device formed by the digital transmit unit 5 and the analog transmit unit 8 remains unchanged, as does the frequency generator unit 6 and thereby the entire control processing device 1. Also only one synthesizer 11 continues to be needed. Instead of one analog reception unit 16 however, three analog reception units 16 are now shown. These are embodied identically, i.e. in modular form and in the exemplary embodiment all built into the radio-frequency small signal sub-housing 3, however it is also possible to use separate housings. So that the synchronization clock and the LO intermediate frequency can be transmitted to all analog reception units 16, a synchronization splitter 28 and an LO splitter 29 are provided, with each of these splitters 28, 29 being depicted as a 1:3 splitter.

Ninety-six receive channels can now be processed via the analog reception unit 16, for example. Six data receiving structural units 22 are now needed for this purpose and are also provided. The PCI bus 27 of the image processing computer 25 however does not possess sufficient slots for the data receiving constructional units 22. Thus only two data receiving structural units 22 are built into the image processing computer 25. However, a PCI expansion card 30 is connected to the PCI bus at this location. This communicates via a communication link 31 with a PCI bridge component 32, which is also part of a PCI expansion device 33. Any communication protocol can be selected in this case as the communication protocol of the communication link 31, i.e. proprietary or standardized, for example Ethernet, Infiniband, Fiber Channel, SCSI, etc. Wire or glass fiber can be used as a transmission medium. The bridge component 32 now converts this communication protocol once again into PCI signaling. This creates an expansion 34 of the PCI bus 27 with further slots, to which four further data receiving constructional units 22 are connected. Such an expansion 34 can have, for example, 7 slots and naturally accommodate a further PCI expansion card 30, so that the number of PCI slots can be further increased. Since the bridge component 32 numbers the PCI buses in the manner defined in the standard, the slots of the expansion 34 can be accessed in precisely the same way as the slots in the PCI bus 27 of the image processing computer 25. The software driver for the data receiving structural units 22 has been expanded accordingly to enable the corresponding number of data receiving constructional units 22 to be handled, something which can easily be implemented since the data receiving modules are identical and behave in the same manner.

Since the control communication bus 24 can only be loaded up to a certain limit, so that for example only 4 data receiving structural units 22 can be connected to it, an additional control communication bus splitter 35 is provided, here a 1:2 splitter. This is easily possible since the control communication bus 24 operates omnidirectionally and transmits TTL signals. Accordingly the control communication bus splitter 35 can be implemented simply using TTL driver chips.

This means that basically the expansion possibilities are not restricted in any way. If for example n analog reception units 16 are used, as indicated by the dots 36, the splitters 28 and 29, as indicated by the dots 37, are embodied as 1:n splitters. 2n data receiving structural units 22 will then be needed, which can be connected to corresponding bus expansions 34, which is indicated by the dots 38. An expansion of the control communication bus splitter 35 to a 1:n splitter can then be necessary, as indicated by the dots 39.

Thus, due to the modularity of the analog reception units 16 and the modular data receiving structural unit 22, which groups together the digital reception unit 40 and the data preparation unit 41, it is possible to accommodate and to process any number of reception channels.

Figure 3:
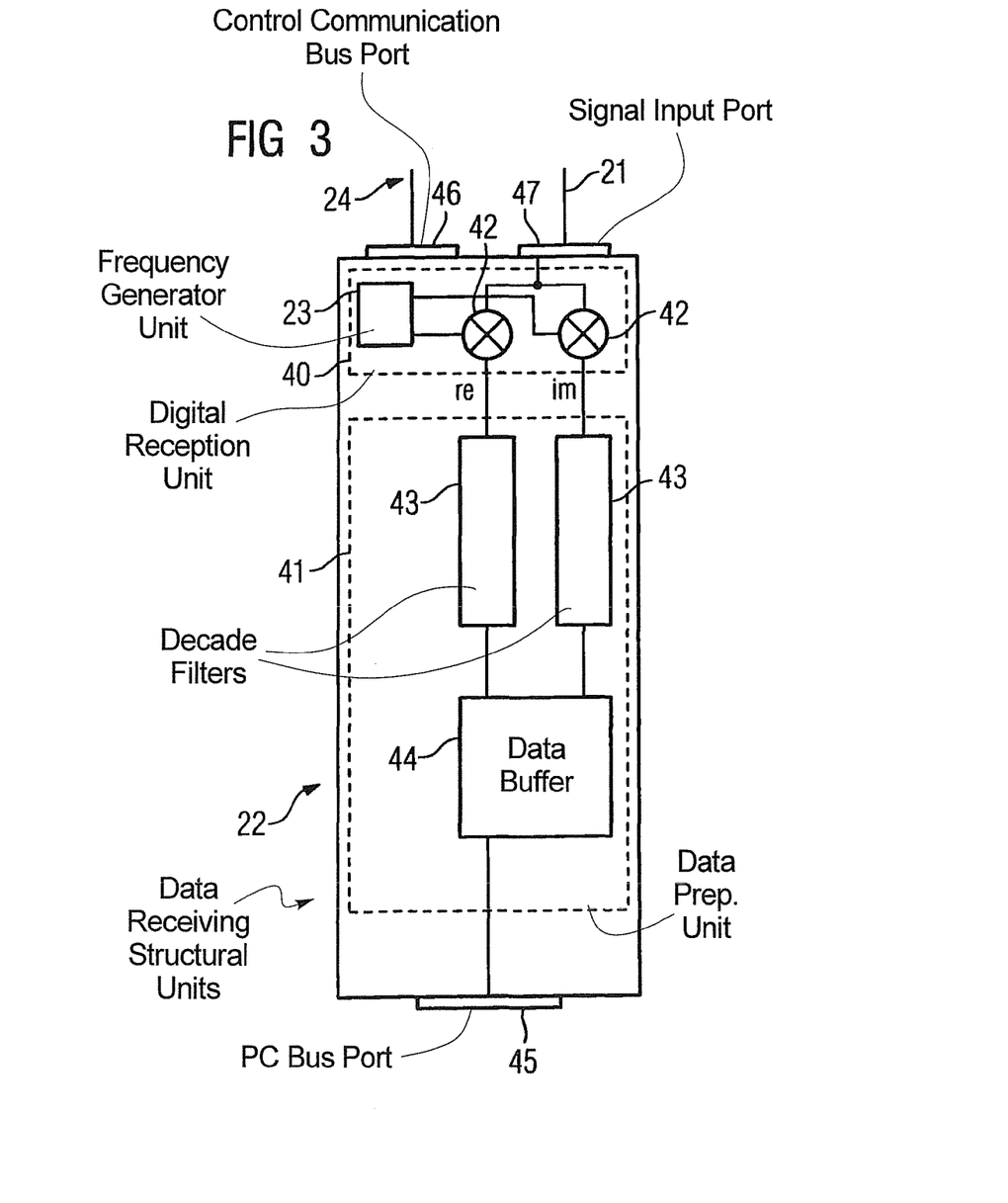
FIG. 3 is a block diagram of a data receiving structural unit for use in the inventive magnetic resonance system.

FIG. 3 shows the basic diagram of a data receiving structural unit 22, in which the digital reception unit 40 and the data preparation unit 41 are combined into one unit. The digital reception unit 40 includes the frequency generator unit 23 and corresponding electronics 42 for demodulation and, where necessary, signal processing of the real and of the imaginary part of the signal. The data preparation unit 41 includes a decade filter 43 for the real part re and for the imaginary part im and a data buffer 44 in each case. The decade filters are used, by means of interpolation, to reduce the sample rate to a value with which the image processing computer 25 can work, and for filtering the signal. The data are buffered in the data buffer 44.

The data receiving structural unit 22 includes three ports, namely a PC bus port 45, the control communication bus port 46 and the signal input port 47 for the fiber optic communication link 21.

Figure 4:
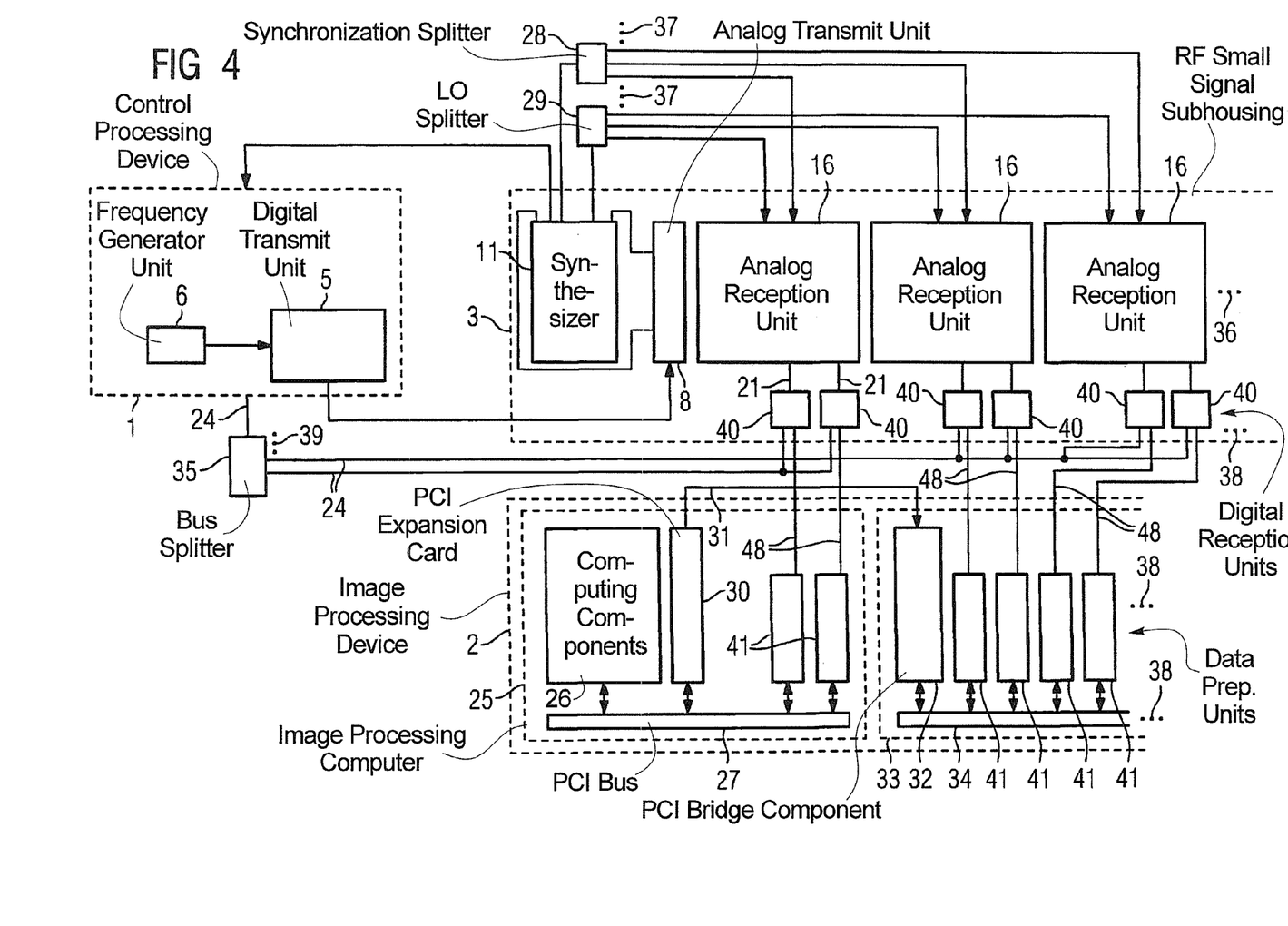
FIG. 4 is a block diagram of the transmit and reception system of a magnetic resonance system according to a further embodiment.

FIG. 4 shows a further embodiment of the present invention, with the digital reception unit 40 and the data preparation unit 41 being provided as separate units. The same components are also provided here with the same reference symbols. The digital reception units 40, which are in this embodiment each of modular design, are built into the radio-frequency small signal sub-housing 3 in this case and connected via the communication link 21 to the analog reception unit 16. In addition they are connected via corresponding connections to the control communication bus 24. A further communication link 48 transmits the demodulated signal, preferably also of a fiber optic link to the data preparation units 41, each of which is provided with a PCI port, and are connected to the PCI bus 27 of the image processing computer 25 arranged in the image processing device 2. Here as well, because of the modular concept of the analog reception units 16, of the digital reception units 40 and of the data preparation units 41, any given expansion is conceivable.

It should be noted that many other embodiments are possible without departing from the protected area of the present invention. Thus, for example, the synthesizer 11 can also be accommodated in another installation unit or a purely digital system could be present, in which signals converted directly by the D/A converters in the transmit case are forwarded to the radio-frequency antennas or are immediately converted by the A/D converter and then only processed digitally. In this case the analog units 8 and 16 are reduced to these A/D converters.

Although modifications and changes may be suggested by those skilled in the art, it is the intention of the inventor to embody within the patent warranted hereon all changes and modifications as reasonably and properly come within the scope of his contribution to the art.

We claim as our invention:
1. A magnetic resonance system comprising:
   a magnetic resonance scanner configured to interact with a subject in order to obtain magnetic resonance data therefrom, said magnetic resonance scanner comprising
      a first installation unit, and a further installation unit physically separate from and structurally unconnected to said first installation unit;
      a radio-frequency coil arrangement that transmits and receives magnetic resonance signals relative to the subject;
      a signal transmission arrangement that causes said radio-frequency coil to emit radio-frequency signals, comprising
         a digital transmit unit built into said first installation unit that emits a digital transmit signal, and
         an analog transmit unit supplied with said digital transmit signal that emits an analog transmit signal based on said digital transmit signal;

a reception arrangement that processes radio-frequency signals received by said radio-frequency coil arrangement, comprising at least one analog reception unit that converts an analog reception signal received by said radio-frequency coil arrangement into a digital reception signal, and at least one digital reception unit that digitally demodulates the digital signal, said digital reception unit being built into said further installation unit;

a first frequency generator unit connected to said digital transmit unit in said first installation unit, at least one second frequency generator unit connected to said at least one digital reception unit in said further installation unit; and a communication link placing said first frequency generator unit and said at least one second frequency generator unit in communication with each other in order to synchronize operation of the first frequency generator unit and said at least one second frequency generator unit with each other.

2. A magnetic resonance system as claimed in claim 1 wherein each of said first frequency generator unit and said at least one second frequency generator unit is a numerically controlled oscillator.

3. A magnetic resonance system as claimed in claim 1 comprising a radio-frequency small signal sub-housing containing said analog reception unit and said analog transmit unit.

4. A magnetic resonance system as claimed in claim 1 wherein said communication link is a control communication bus.

5. A magnetic resonance system as claimed in claim 4 comprising at least two digital reception units, and a control communication bus splitter connected to said control communication bus that splits control communication signals on said control communication bus to said at least two digital reception units.

6. A magnetic resonance system as claimed in claim 1 wherein said digital reception unit comprises a plurality of processable channels, and wherein said analog reception unit comprises a plurality of output channels equal to, or a whole-number multiple of, said plurality of processable channels of said digital reception unit, with the outputs of the analog reception unit being respectively connected to one of said processable channels or said whole-number multiple of said processable channels.

7. A magnetic resonance system as claimed in claim 1 comprising a plurality of analog reception units and a plurality of digital reception units, said plurality of analog reception units being equal to, or a whole-number multiple of, said plurality of digital reception units, with the respective analog reception units being respectively connected to one of said digital reception units or said whole-number multiple of said digital reception units.

8. A magnetic resonance system as claimed in claim 1 wherein said further installation unit is an image processing device.

9. A magnetic resonance system as claimed in claim 8 wherein said image processing device comprises an image processing computer in which said at least one digital reception unit is incorporated.

10. A magnetic resonance system as claimed in claim 9 comprising a data preparation unit connected between said at least one digital reception unit and said image processing computer, said data preparation unit editing said digital reception signal in order to form image data therefrom.

11. A magnetic resonance system as claimed in claim 10 wherein said data preparation unit and the digital reception connected thereto are mechanically integrated into a data receiving structural unit.

12. A magnetic resonance system as claimed in claim 11 comprising a communication bus placing said data preparation unit and said image processing computer in communication with each other.

13. A magnetic resonance system as claimed in claim 12 wherein said communication bus is a PCI bus.

14. A magnetic resonance system as claimed in claim 12 comprising an expansion device with a bridge module that expands a number of terminals of said control communication bus of said image processing computer.

15. A magnetic resonance system as claimed in claim 14 wherein said control communication bus is a PCI bus and wherein said at least one expansion device is at least one PCI expansion device.

16. A magnetic resonance system as claimed in claim 1 comprising a synthesizer connected to each of said first frequency generator unit and said at least one second frequency generator unit, said synthesizer generating a synchronization clock signal that is supplied to said frequency generator unit and to said at least one second frequency generator unit.

17. A magnetic resonance system as claimed in claim 16 wherein said synthesizer additionally generates an analog LO frequency signal enabling analog modulation or demodulation.

18. A magnetic resonance system as claimed in claim 17 comprising a plurality of analog reception units, and an LO splitter that splits said LO frequency signal to said plurality of analog reception units.

19. A magnetic resonance system as claimed in claim 16 comprising a plurality of analog reception units, and a synchronization splitter that splits said synchronization clock to said plurality of analog reception units.

* * * * *